(12) United States Patent
Jeljeli et al.

(10) Patent No.: US 11,575,501 B2
(45) Date of Patent: Feb. 7, 2023

(54) PRESERVING AGGREGATION USING HOMOMORPHIC ENCRYPTION AND TRUSTED EXECUTION ENVIRONMENT, SECURE AGAINST MALICIOUS AGGREGATOR

(71) Applicant: Seagate Technology LLC, Fremont, CA (US)

(72) Inventors: Hamza Jeljeli, Singapore (SG); Saravanan Nagarajan, Singapore (SG)

(73) Assignee: Seagate Technology LLC, Fremont, CA (US)

(*) Notice: Subject to any disclaimer, the term of this patent is extended or adjusted under 35 U.S.C. 154(b) by 149 days.

(21) Appl. No.: 17/031,035

(22) Filed: Sep. 24, 2020

(65) Prior Publication Data
US 2022/0094519 A1    Mar. 24, 2022

(51) Int. Cl.
*H04L 9/00* (2022.01)
*H04L 9/08* (2006.01)
*H04L 9/30* (2006.01)

(52) U.S. Cl.
CPC .............. *H04L 9/008* (2013.01); *H04L 9/088* (2013.01); *H04L 9/30* (2013.01)

(58) Field of Classification Search
CPC . H04L 9/008; H04L 9/088; H04L 9/30; H04L 2209/46
See application file for complete search history.

(56) References Cited

U.S. PATENT DOCUMENTS

| 8,498,941 B2 | 7/2013 | Felsher |
| 8,520,844 B2 | 8/2013 | MacKenzie |
| 8,555,400 B2 | 10/2013 | Shi et al. |

(Continued)

FOREIGN PATENT DOCUMENTS

| CN | 104219056 A | 12/2014 |
| CN | 105827402 A | 8/2016 |

(Continued)

OTHER PUBLICATIONS

A Security Privacy Protection Scheme for Data Collection of Smart Meters Based on Homomorphic Encryption, by Yukun et al., published Jul. 2013 (Year: 2013).*

(Continued)

*Primary Examiner* — Vu V Tran
(74) *Attorney, Agent, or Firm* — Kagan Binder, PLLC

(57) ABSTRACT

A method includes providing a public encryption key and a seed to a party and receiving a first encrypted data set encrypted using the public encryption key and marked by the party with a first mark based on the seed. The method also includes aggregating the first encrypted data set into an aggregated data set at an aggregator and receiving an indication that a first operation associated with the party has been performed on the aggregated data set. In response to the receiving, updating the first encrypted data set of the aggregated data set by updating the first mark to a second mark according to the first operation, generating a verification encrypted data set according to at least the second mark and at least the corresponding first operation, verifying the aggregated data set by comparing the updated first encrypted data set and the verification encrypted data set.

17 Claims, 7 Drawing Sheets

(56) References Cited

U.S. PATENT DOCUMENTS

| | | | |
|---|---|---|---|
| 8,862,879 | B2 | 10/2014 | Lerner |
| 9,503,263 | B2 | 11/2016 | Johnston |
| 10,043,035 | B2 | 8/2018 | LaFever et al. |
| 10,069,631 | B2 | 9/2018 | Rane et al. |
| 10,333,696 | B2 | 6/2019 | Ahmed |
| 10,454,668 | B2 | 10/2019 | Pasol et al. |
| 10,546,141 | B2 | 1/2020 | Miguel et al. |
| 2002/0103999 | A1 | 8/2002 | Camnisch et al. |
| 2005/0220306 | A1* | 10/2005 | Westhoff ................ H04L 9/008 380/270 |
| 2012/0144185 | A1 | 7/2012 | Raykova et al. |
| 2014/0098960 | A1 | 4/2014 | Xu et al. |
| 2015/0154422 | A1 | 6/2015 | Ben Hamouda et al. |
| 2015/0236849 | A1 | 8/2015 | Ayday et al. |
| 2016/0224735 | A1 | 8/2016 | Ayday et al. |
| 2017/0099133 | A1 | 4/2017 | Gu et al. |
| 2017/0155515 | A1 | 6/2017 | Androulaki et al. |
| 2018/0019983 | A1* | 1/2018 | Tissot ................... G06F 21/602 |
| 2018/0139190 | A1 | 5/2018 | Chaum |
| 2018/0307859 | A1 | 10/2018 | LaFever et al. |
| 2018/0359229 | A1* | 12/2018 | Ding ................... H04L 63/0464 |
| 2019/0013950 | A1 | 1/2019 | Becker et al. |
| 2019/0089547 | A1 | 3/2019 | Simplicio, Jr. et al. |
| 2019/0182027 | A1 | 6/2019 | Kipnis et al. |
| 2019/0244138 | A1* | 8/2019 | Bhowmick ............. H04L 67/10 |
| 2019/0266343 | A1* | 8/2019 | Parida ................. G06F 21/6245 |
| 2019/0363878 | A1 | 11/2019 | Sato et al. |
| 2021/0019754 | A1 | 1/2021 | Muthukrishnan |
| 2021/0359846 | A1* | 11/2021 | Wright ................. H04L 9/0869 |
| 2022/0070009 | A1 | 3/2022 | De Hoogh |

FOREIGN PATENT DOCUMENTS

| | | |
|---|---|---|
| CN | 107682145 A | 2/2018 |
| CN | 107682159 A | 2/2018 |
| CN | 108449317 A | 8/2018 |
| CN | 108769023 A | 11/2018 |
| CN | 109039578 A | 12/2018 |
| CN | 109167778 A | 1/2019 |
| CN | 110113155 A | 8/2019 |
| CN | 110113203 A | 8/2019 |
| CN | 111385306 A | 7/2020 |
| KR | 101912443 B1 | 10/2018 |
| KR | 101936033 B1 | 1/2019 |

OTHER PUBLICATIONS

Gentry et al.. Homomorphic Encryption from Learning with Errors: Conceptually-Simpler, Asymptotically-Faster, Attribute-Based, In: Crypto 2013: Advances in Cryptology, 33rd Annual Cryptology Conference, Santa Barbara, CA, USA, Aug. 18-22, 2013, pp. 75-92, 2013.

Regev, Oded, On lattices, learning with errors, random linear codes, and cryptography, STOC 2005: Proceedings for the thirty-seventh annual ACM symposium on Theory of computing, pp. 84-93, May 2005.

Gentry, Fully Homomorphic Encryption Using Ideal Lattices, In: STOC 2009: Proceedings of the forty-first annual ACM Symposium on Theory of computing, pp. 169-178, May 2009.

Grolmusz, Vince, Superpolynomial Size Set-systems with Restricted Intersections mod 6 and Explicit Ramsey Graphs, In: Combinatorica, vol. 20, 15 pages, Nov. 8, 1999.

M. Dahl et al., "Private Data Aggregation on a Budget", Cryptology ePrint Archive Report 2017/643, 2017, eprint.iacr.org, 36 pages, Mar. 15, 2017.

* cited by examiner

PRESERVING AGGREGATION USING HOMOMORPHIC ENCRYPTION AND TRUSTED EXECUTION ENVIRONMENT, SECURE AGAINST MALICIOUS AGGREGATOR

BACKGROUND

The present invention is directed to improvements to hardware and computer security, and more specifically to improvements to computer data privacy and security in homomorphic encryption in a minimal trust environment.

Data aggregation is the process of consolidating data coming from different entities. Aggregation is a powerful data analytics tool that can be used to understand a model, to do a prediction or to make a decision. Different entities might be interested in computing aggregated statistics over joint data, but may be concerned with safeguarding privacy of their respective inputs, which can include sensitive data or information. Data aggregation is desirable in many computer systems and schemes. However, data aggregation poses the challenge of how to protect the privacy of the participants, parties, or users, especially when the parties do not trust each other and other computer-based entities such as a data aggregator or decryptor, which also may distrust each other. Typically, the aggregator is a separate entity to the decryptor, either virtually or physically.

One existing approach for data aggregation is to use the service of a third-party aggregator that obtains individual parties' inputs, performs the aggregation and publishes the result. Such model inherently allows the aggregating third-party entity to learn all the individual parties' data. A mitigation method for this model is referred to as dataset anonymization, in which another third party removes any unique identifiers from the data in order to make harder to connect a given input to the party that provided it. However, linking the data to the owners of the data remains possible. In addition, this existing model poses a trust boundary problem as the participating parties need to trust the new anonymizing third-party entity with the data. Furthermore, existing approaches also do not account for fully malicious parties that would deviate from assigned method steps to obtain authorized access to private encrypted data.

Certain existing private data aggregation protocols include specific multiparty computation (MPC) protocols that were specifically designed for data aggregation. However, these protocols assume semi-honest aggregator or rely on the security assumption that some parties are not colluding. Such assumption can limit the adoption of the solution for some applications for which the parties do not trust each other.

Therefore there remain problems to be addressed in the data security and hardware fields.

SUMMARY

Disclosed is a practical privacy-preserving solution that combines hardware security with cryptographic techniques such that the aggregator is still able to publish the aggregated result, but does not learn any information about the individual private inputs. The present disclosure requires only a minimal trust boundary and remains secure even if the aggregating party is malicious and seeks unauthorized access to the encrypted data being aggregated.

Aspects of the invention described herein are also directed to improvements to homomorphic encryption as performed using one or more computers or computing systems or networks, such as configuring computer systems to verify whether the parties performed the assigned computations only. Disclosed embodiments also provide computer-based privacy preserving features, e.g., using and assigning seeds, marks, and pseudo random generated values, to users in a homomorphic encryption scheme, such as partially, or somewhat homomorphic encryption schemes.

According to a first aspect, a method of improving data security or privacy in a homomorphic encryption computing environment is disclosed. According to the first aspect, the method includes providing a public encryption key and a first seed to a first party of one or more parties. The method also includes receiving a first encrypted data set encrypted using the public encryption key and marked by the first party with a first mark based on the first seed. The method also includes aggregating the first encrypted data set into an aggregated data set at an aggregator. The method also includes receiving an indication that a first operation associated with the first party has been performed on the aggregated data set. The method also includes, in response to the receiving, updating the first encrypted data set of the aggregated data set by updating the first mark to a second mark according to the first operation. The method also includes generating a verification encrypted data set according to at least the second mark and at least the corresponding first operation. The method also includes verifying the aggregated data set by comparing the updated first encrypted data set and the verification encrypted data set.

According to a second aspect of the present disclosure, a system is disclosed. According to the second aspect, the system includes a hardware processor operatively coupled to a memory. Also according to the second aspect, the hardware processor is configured to execute instructions stored on the memory, including instructions for a process for improving data security or privacy in a computing environment. According to the second aspect, the process includes providing a public encryption key and a first seed to a first party of one or more parties. The process also includes receiving a first encrypted data set encrypted using the public encryption key and marked by the first party with a first mark based on the first seed. The process also includes aggregating the first encrypted data set into an aggregated data set at an aggregator. The process also includes receiving an indication that a first operation associated with the first party has been performed on the aggregated data set. The process also includes, in response to the receiving, updating the first encrypted data set of the aggregated data set by updating the first mark to a second mark according to the first operation. The process also includes generating a verification encrypted data set according to at least the second mark and at least the corresponding first operation. The process also includes verifying the aggregated data set by comparing the updated first encrypted data set and the verification encrypted data set.

According to a third aspect of the present disclosure, a computer program product for improving data security or privacy is disclosed. The computer program product includes a computer-readable storage medium having program code embodied therewith, the program code includes computer-readable program code configured to cause a processor to perform steps. The steps include providing a public encryption key and a first seed to a first party of one or more parties. The steps also include receiving a first encrypted data set encrypted using the public encryption key and marked by the first party with a first mark based on the first seed. The steps also include aggregating the first encrypted data set into an aggregated data set at an aggregator. The steps also include receiving an indication that a first operation associated with the first party has been performed on the aggregated data set. The steps also include, in response to the receiving, updating the first encrypted data set of the aggregated data set by updating the first mark to a second mark according to the first operation. The steps also include generating a verification encrypted data set according to at least the second mark and at least the corresponding first operation. The steps also include verifying the aggregated data set by comparing the updated first encrypted data set and the verification encrypted data set.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein.

DETAILED DESCRIPTION

The present invention is directed to computer-implemented homomorphic encryption (HE) schemes, and more specifically to improvements to computer-based and computer-verifiable data privacy, security, and authentication in HE. It is known that HE is useful in many contexts and has many uses. In particular, HE allows for one or more computer to perform operations on encrypted data while the data remains encrypted. Embodiments of the present disclosure are particularly useful in contexts including computing entities in a minimal trust environment, where one or more entity may be malicious, and may seek to illicitly decipher encrypted data without authorization. The computing entities and/or parties can represent various organizations, entities of a consortium or more than one consortium, entities within a corporation, entities of different corporations, and the like.

A computer, computer systems, networks, and the like within a computing environment can individually or collectively compile, aggregate, and perform operations of data from multiple parties that can be used to prepare a combined result, which can then be used to study a pattern, make a prediction, or improve an existing service, among many other beneficial uses. An example computer 700 is discussed with reference to FIG. 7, and an example computing environment 100 in which various embodiments herein can be carried out electronically is discussed with reference to FIG. 1.

HE is a cryptographic concept or mechanism that allows certain computations on encrypted data, generating an encrypted result which, when decrypted, matches the result of the same operations performed on the plaintext data. Computer-based verification of the operations performed via evaluation of HE schemes is a desirable capability particularly in settings where multiple distrusting users, parties, or entities are involved. Existing fully or partially homomorphic computer-based encryption schemes have limited privacy. Therefore, current homomorphic encryption schemes have weak security and privacy guarantees because of a lack of reliable, computer-based verification measures. This has generally necessitated a certain level of trust among the distrusting parties, which may not be desirable or practical, especially in settings where competitors are collaborating and sharing their encrypted data for HE evaluations. The present disclosure improves the operation of one or more computers and makes significant improvements and breakthroughs in both computer security and encryption technology.

Figure 1:
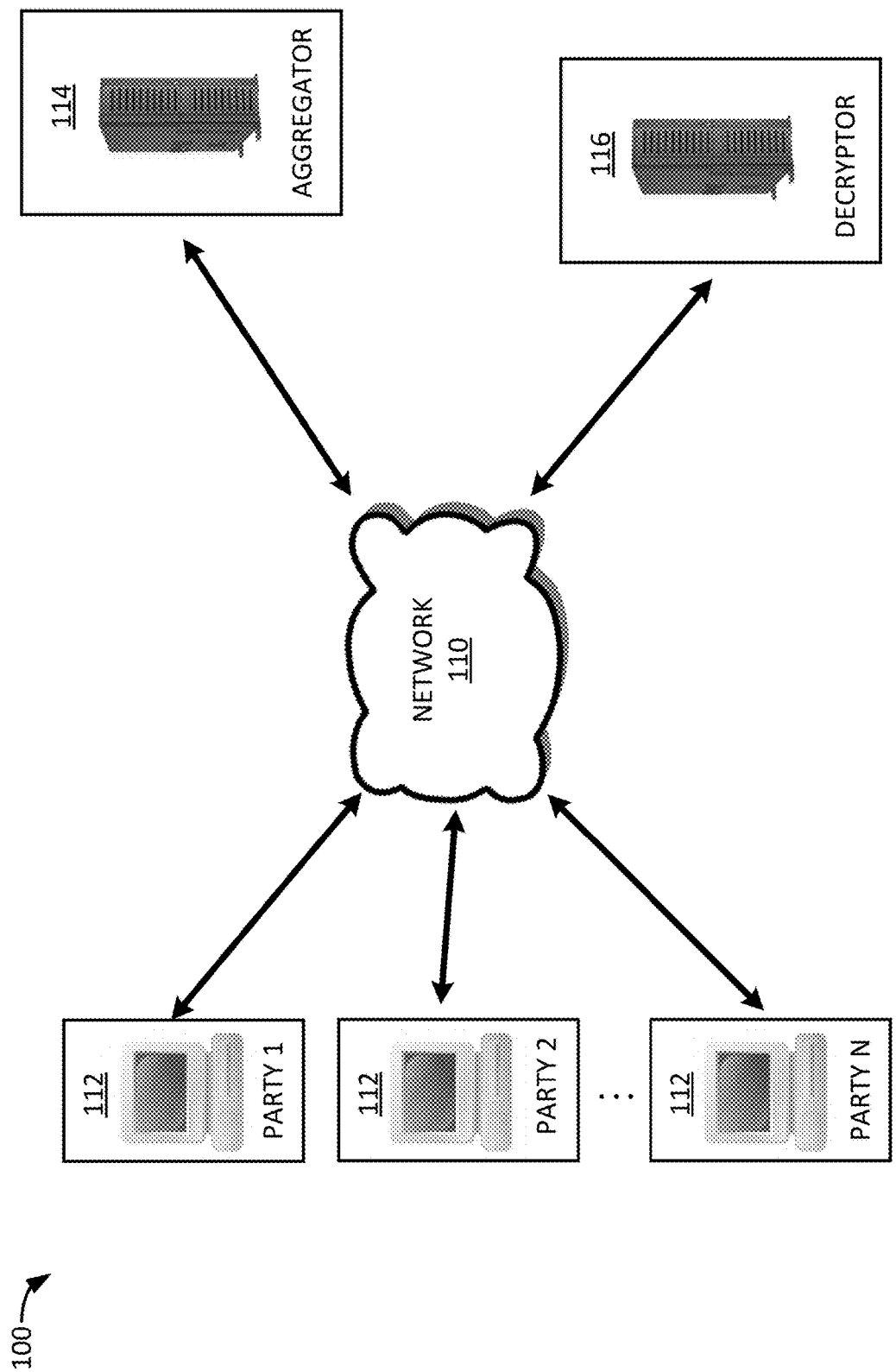
FIG. 1 is a computing environment for use with privacy-preserving homomorphic encryption, according to various embodiments.

FIG. 1 is an exemplary computing environment for use with privacy-preserving and verifiable HE in minimal trust environments, according to various embodiments. Specifically, computing environment 100 can include a computer network 110, an aggregator 114, a decryptor 116, and one or more parties (or participants, users, organizations, computing devices, etc.) 1-N designated at 112. Aggregator 114, decryptor 116, and parties 112 can include computing devices (or groups or networks thereof) operatively coupled to the computer network 110, such as a server computer, a desktop, a laptop, a portable computing device, and/or a wireless sensor or transceiver. As used herein, a party 112 can be used interchangeably with a user, organization, or any other entity involved with the encryption, management, storage, transmission, or other involvement with data. Also as used herein, parties 112 can more generally optionally include computer-based aggregators and/or decryptors, and participants can more specifically represent only parties that provide data for encryption, and other than any aggregators and/or decryptors. It is understood that all embodiments herein can relate to operations at one or more parties 112 or one or more participants as appropriate.

Computer network 110 can include a wired connection, network, a wireless network, or any combination(s) thereof. Various levels of trust can exist between the various entities, including the parties 112, the aggregator 114, and the decryptor 116. In particular, the decryptor 116 and aggregator 114 may not trust each other. In various embodiments there is a single decryptor 116 and a single aggregator 114, although it is understood that each of the decryptor 116 and aggregator 114 can be instead replaced by multiple sub-entities (e.g., computer processors or systems) that together form one or more of the aggregator 114 and/or decryptor 116 as used herein.

During operation, computing system 100 undergoes various operations, such as but not limited to, encryption of data, decryption of data, aggregation of data, and the performance of verifiable and security enhancing homomorphic operations, such as HE operations, pseudo random generation, and the like.

The description below provides for improved security and resilience from malicious entities in HE and a variety of exemplary applications for the improved aggregation and decryption system associated with computing environment 100. In each exemplary application, the discrete treatment of the aggregator 114, the decryptor 116, and the parties 112, allows the parties 112 to contribute their individual data to an aggregator 114 without having to reveal their individual, private unencrypted data values to the data aggregator 114. Preferably, either separate non-colluding or a single computer-based entity hosts the decryptor 116 and aggregator 114. In preferable embodiments, the decryptor 116 verifies that the aggregator 114 has done its job properly and honestly, e.g., without intercepting or falsifying inputs or computer-based data, and without sending misleading messages seeking to obtain unauthorized access to the parties 112 unencrypted data, e.g., plaintexts. The decryptor 116 (or any other suitable entity) can independently and/or separately simulate or "replay" the aggregation and operations performed by the aggregator 114, and corresponding to various marks, in order to verify accuracy and authenticity. As shown at steps 7 and 8, 524 and 526 of FIG. 6, the replay aggregation can be represented as a function (f) with a prime (') indication appended thereto. Furthermore, even an aggregator 114 and a decryptor 116 that do not mutually trust each other can operate without significant security or privacy drawbacks.

According to an example process, a party 112 preferably provides a private plaintext (e.g., x_i of FIG. 2), which the party 112 or other computer-based entity encrypts for transmission. The encrypted plaintext is referred to herein as a ciphertext. As described below, the ciphertext can be encrypted with a seed-based mark generated by the party 112 and combined into a single ciphertext using the packing property. The party 112 can transmit the ciphertext to the aggregator 114 and eventually the decryptor 116 after encryption. Preferably, the decryptor 116 then receives, stores, generates, or otherwise has access to a private key, which is preferably not shared with the other entities. In some examples, the parties 112 can collaborate to generate the public/private key pair, and then share the private key with the decryptor 116. The decryptor 116 uses the private key, which the decryptor does not make available to the aggregator 114, to decrypt the aggregated ciphertext.

The decryptor 116, which can be computer-based, can also operate to provide each party 112 with a seed (e.g., S_i of FIG. 3) in order to allow the party 112 to mark the private data plaintext (x_i) during encryption. Optionally, the decryptor 116 uses the private key to decrypt the aggregated ciphertext which has undergone various operations, e.g., HE operations, while the private data remains encrypted. The decryptor 116 can also authenticate or verify the encrypted, aggregated ciphertext upon receiving it from the aggregator 114. Preferably, when the aggregator 114 performs the HE operations, one or more computers combine the multiple parties' 112 data into an aggregated, encrypted ciphertext. Eventually, and once the ciphertext is decrypted and authenticated by the decryptor 116 using the private key, the decryptor 116 preferably then sends the clear aggregated result back to the aggregator 114. If the decryptor 116 fails to authenticate the aggregated ciphertext, the aggregator 114 does not send the decrypted plaintext corresponding to the aggregated ciphertext. If permitted by the decryptor 116, the aggregator 114 then can distribute the decrypted data using the computer network 110, and according to various computing schemes.

Disclosed embodiments offer computer-implemented methods and systems that provide numerous benefits over the existing HE solutions, including in particular improved somewhat HE (SHE) and partially HE (PHE) schemes. Embodiments herein also provide improvements over existing fully HE schemes. This disclosure provides for computer-based verification of aggregator actions by the decryptor using pseudo random generation and reproducible computer operations. Previously existing schemes lacked the malicious entity-resistant features described herein. According to the present disclosure, a computer-based decryptor 116 can evaluate or determine a total number of evaluations of an encrypted ciphertext performed at the aggregator 114, and a computer can assign each party 112 a seed for generating a mark by the party 112, such as by pseudo random generation, to provide authentication of the aggregator's actions in a minimal trust environment in particular.

Various embodiments of the present disclosure utilize the concepts and principles of "Learning with Errors" concept described in Regev ("On lattices, learning with errors, random linear codes, and cryptography" Oded Regev. In: STOC 2005, pp. 84-93), which operates to provide computer-based systems with improved quantum-computing resistance to the well-established and well-understood principles of the Rivest-Shamir-Adleman (RSA) public key infrastructure (PKI) public/private key encryption scheme. The improved Learning with Errors scheme of Regev is difficult to solve, and provides for discrete and finite lattices that are generated with bits that are challenging for quantum computing to decipher and therefore decrypt. This further improves the privacy and security aspects of the disclosed embodiments.

In an HE scheme, a message space can be defined as a ring over which a computer evaluates arithmetic circuits (including, e.g., addition and/or multiplication gates) homomorphically. Multiplicative HE is more complex than additive HE. Each of the multiplicative and additive forms of HE are examples of PHE algorithms. Additive HE is commonly used due to its ease of implementation. In some examples according to the present disclosure, a computer performs a limited number of multiplicative and additive operations in a SHE environment or scheme. Finally, according to certain disclosed HE schemes, a computer evaluates the various multiplication gates of the circuit first, followed by the addition gates according to a separate protocol. In other embodiments, a computer in a single computation can evaluate all multiplication and addition gates of the various HE schemes.

Implementing privacy-preserving HE in computing environment 100, such as where the parties 112 can provide updatable marks based on repeatable pseudo random generation, is therefore beneficial to privacy and security in addition to authentication and protection from malicious interference from certain entities in various HE schemes. Introducing pseudo random generation to each party 112 to HE typically has the challenge that the pseudonyms can be predictable, and hence insufficient for achieving significant security and/or privacy. Alternatively, by having a third party compute the pseudo random or fully random marks, more uncertainty and security weaknesses could be introduced. By performing simulated or repeated operations in the trusted execution environment of the decryptor 116, the authenticity of the aggregator's 114 output can therefore be efficiently and predictably verified by computer. Embodiments of the present disclosure make significant improvements to computers, computing environment 100, and existing HE schemes.

Figure 2:
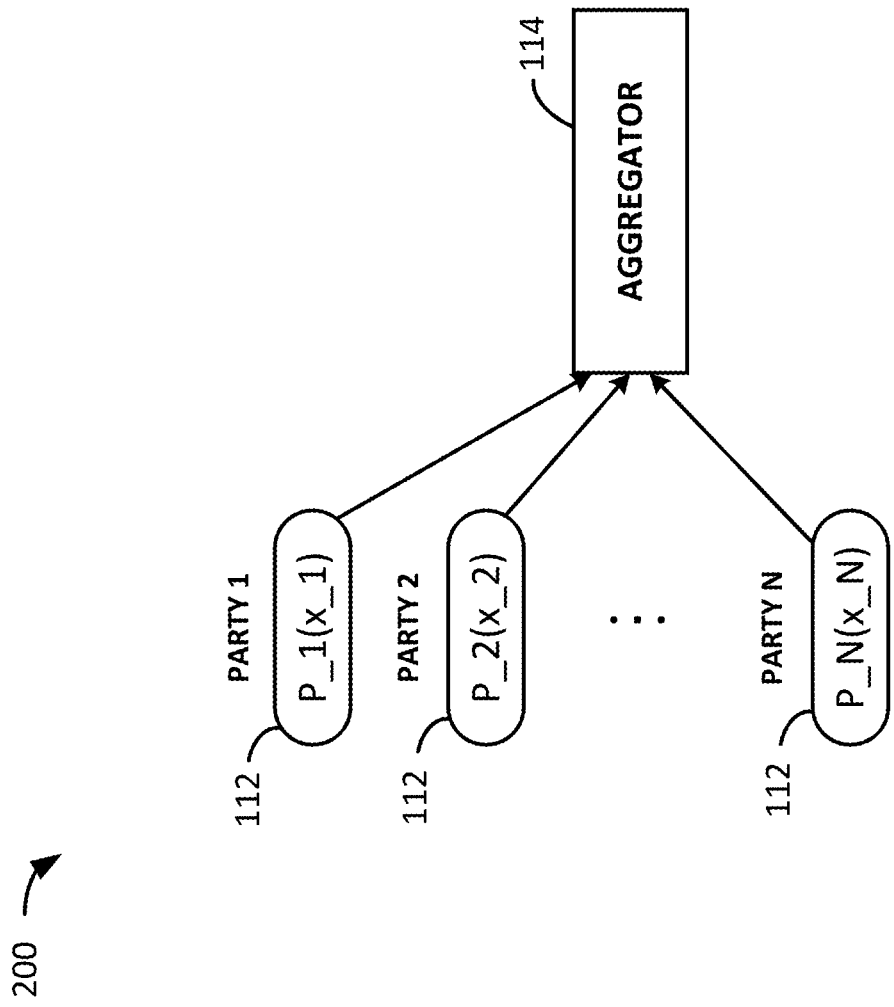
FIG. 2 shows private data aggregation at an aggregator, according to various embodiments.

FIG. 2 shows private data aggregation 200, according to various embodiments. In particular, N parties 112 (P_1, P_2, . . . , P_N; P_i) each hold private and/or sensitive data (x_1, x_2, . . . , x_N; x_i) designated numerically herein based on the corresponding number of the providing party 112. The parties 112 then encrypt and provide the private data x_i to the aggregator 114 who then provides an aggregation function in order to combine and aggregate the parties' 112 encrypted data, while the data remains encrypted throughout. Some examples of private data x_i include, but are not limited to: locations, personal health data, web history, auction data, salaries, financial data, confidential data, and the like. The aggregator 114 can be a third party entity that wishes to run aggregate queries and/or operations on the data x_i received from the parties 112. For example, the aggregator 114 can compute a sum $\Sigma\_i\, x\_i$, an average $(1/N)\, \Sigma\_i\, x\_i$, a $2^{nd}$ order moment $(1/N)\, \Sigma\_i\, x\_i^2$; a variance $(1/N)\, \Sigma\_i\, (x\_i^2\text{-average}^2)$; multivariate, where party 112 has $x\_i = x\_i, 1, \ldots, x\_i, N$, and $X = (x\_1, x\_2, \ldots, x\_N)$, the mean is $(1/N)\, \Sigma\_x\_i$, and the covariance is $(1/N^2)(NX^T X - (N^*\text{mean})(N^*\text{mean})^T)$; an election where a user makes a choice between, e.g., three possible candidates, $X_i = [0,1,0]$ and user I votes for $2^{nd}$ candidate, and the like.

Figure 3:
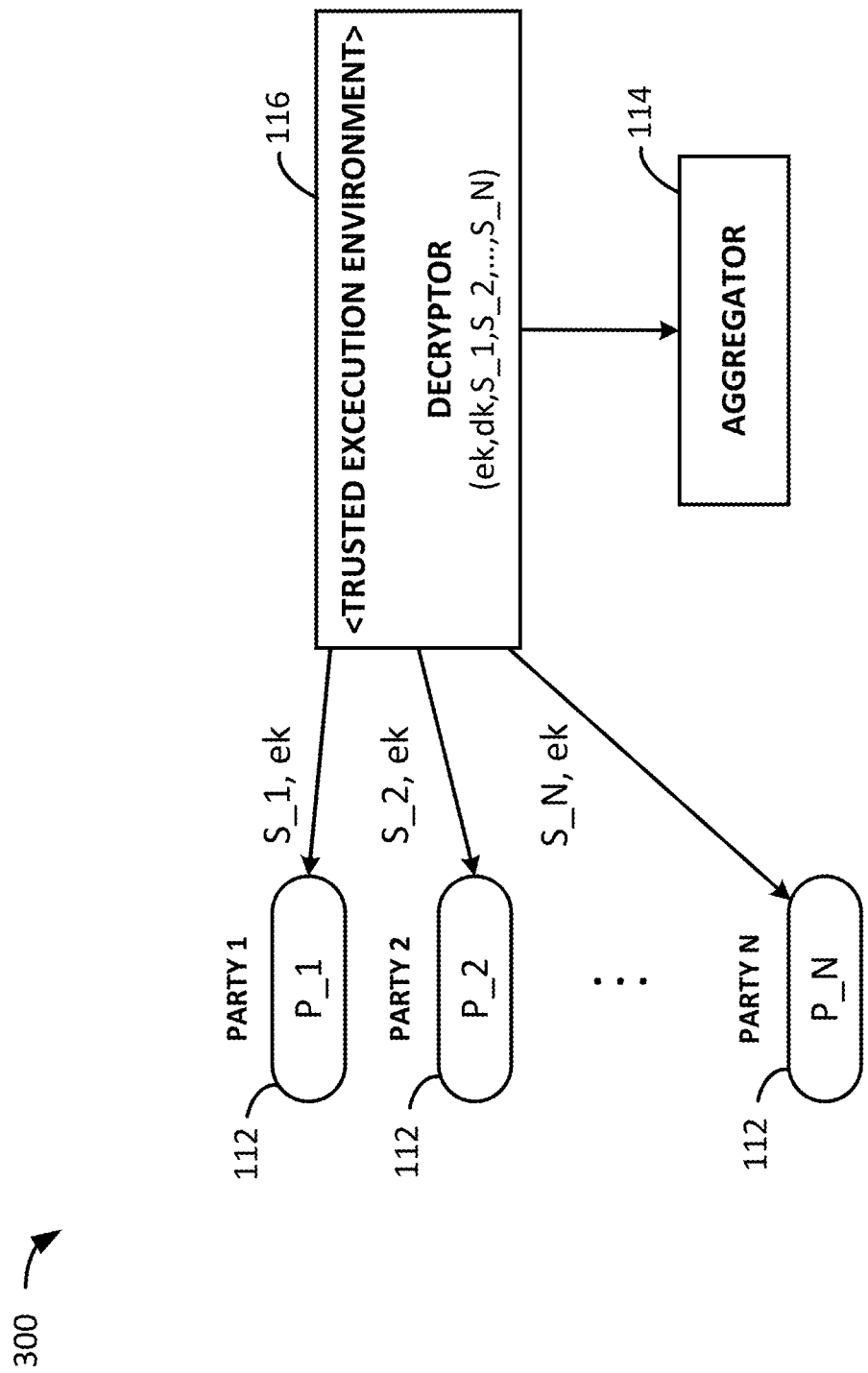
FIG. 3 shows distribution of generated keys and seeds from a decryptor to multiple parties, according to various embodiments.

As shown in FIG. 3, the decryptor 116 initially generates a corresponding pair of HE encryption/decryption keys, including a public key (ek) and a private key (dk). The public, encryption key is provided to all parties 112 and to the aggregator 114. The decryption (private) key is kept secret by the decryptor 116. Each party 112 receives a seed S_i from the decryptor 116 to generate a corresponding individual mark, preferably in combination with a pseudo random generator (PRG), the mark (m_i) (see Step 1, 510 of FIG. 5) to be used during encryption by each party 112.

As described herein, the parties 112 operate to encrypt their respective data using a public key (ek) provided by the decryptor 116 and mark the data with a mark based on a seed (S_1, S_2, ..., S_N; S_i) also received from the decryptor 114, as shown in FIG. 3. The processes shown in FIGS. 2 and 3 are shown in greater detail in FIGS. 4 and 5. As shown, the decryptor 116 also holds a private key (dk) for use in decrypting data x_i encrypted by parties 112, but the private key is preferably not distributed to the other entities.

Figure 4:
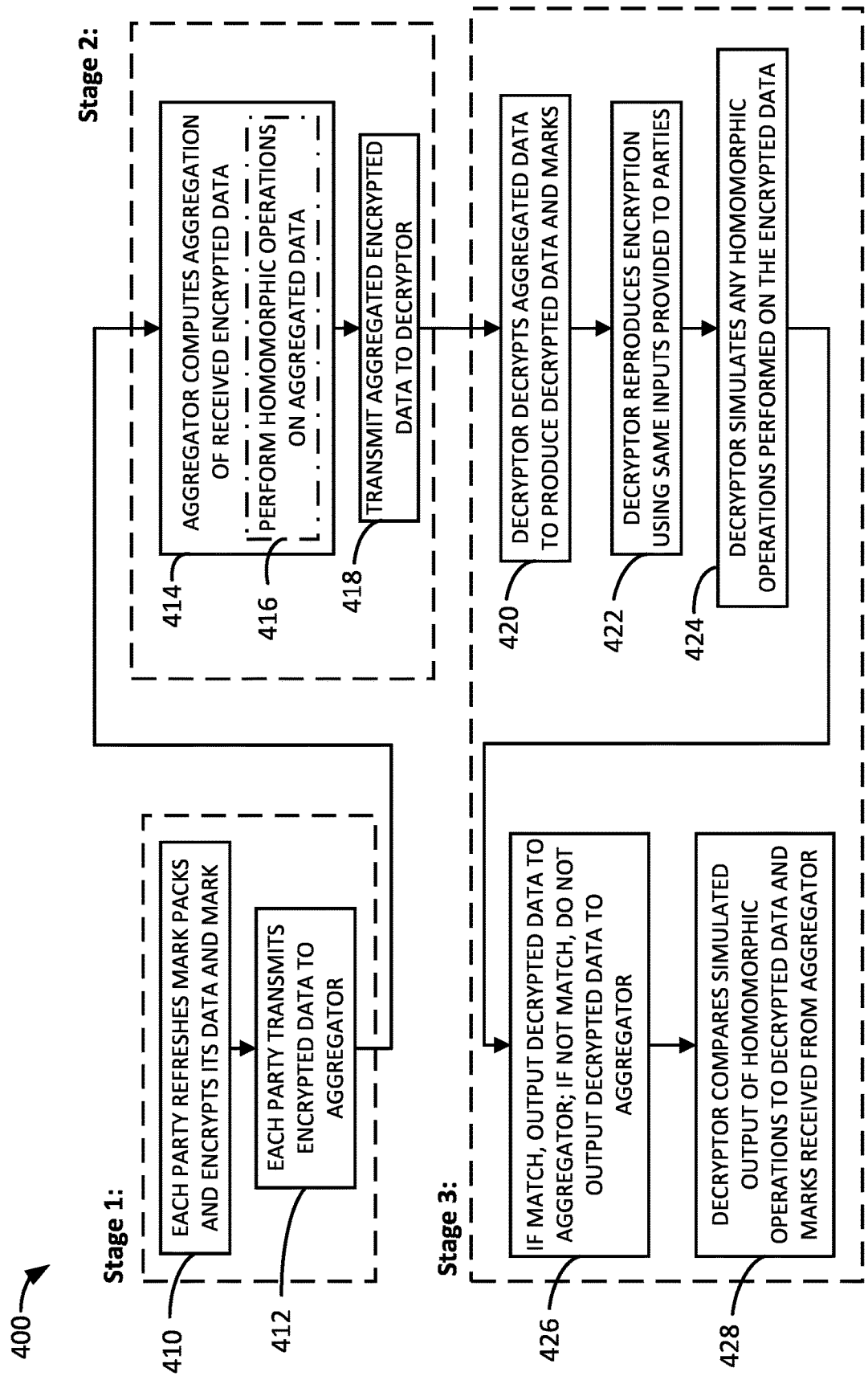
FIG. 4 shows a method for verifying aggregation and operation integrity in a minimal trust environment, according to various embodiments.

FIG. 4 is a method 400 for verifying aggregation and operation integrity, according to various embodiments. Method 400 involves an example aggregation, homomorphic encryption, and data security protocol contemplated herein. Method 400 is composed of three stages, as follows.

At a first stage of method 400, each party 112 uses a computer to refresh or update its respective mark (as generated based on the seed received from the decryptor and based on pseudo random generation of a number of iterations) and packs its data and its mark at 410 and transmits the obtained ciphertext to the aggregator at 412 (steps 1 and 2 shown in FIG. 5, described below). In various embodiments a computer employs a "packing property," in which multiple plaintexts and/or marks are combined into a single encrypted ciphertext, which can take the form of a vector of two or more plaintexts certifiably packed with the marks. In some examples, the packing property can pack one unencrypted plaintext with one or more marks into a single encrypted ciphertext.

At a second stage of method 400, the aggregator 114 computes the aggregation over the received ciphertexts at 414. The aggregation computation of the encrypted ciphertexts at operation 414 can comprise one or more homomorphic operations shown at 416 to obtain another ciphertext that corresponds to the aggregation of the unencrypted plaintexts, including party 112 inputs and marks as described herein. The obtained ciphertext packs the aggregation of inputs of the parties 112 as well as the aggregation of their marks (steps 3 and 4 of FIG. 5), and a computed transmits the aggregated encrypted data to the decryptor 116 at operation 418.

Figure 6:
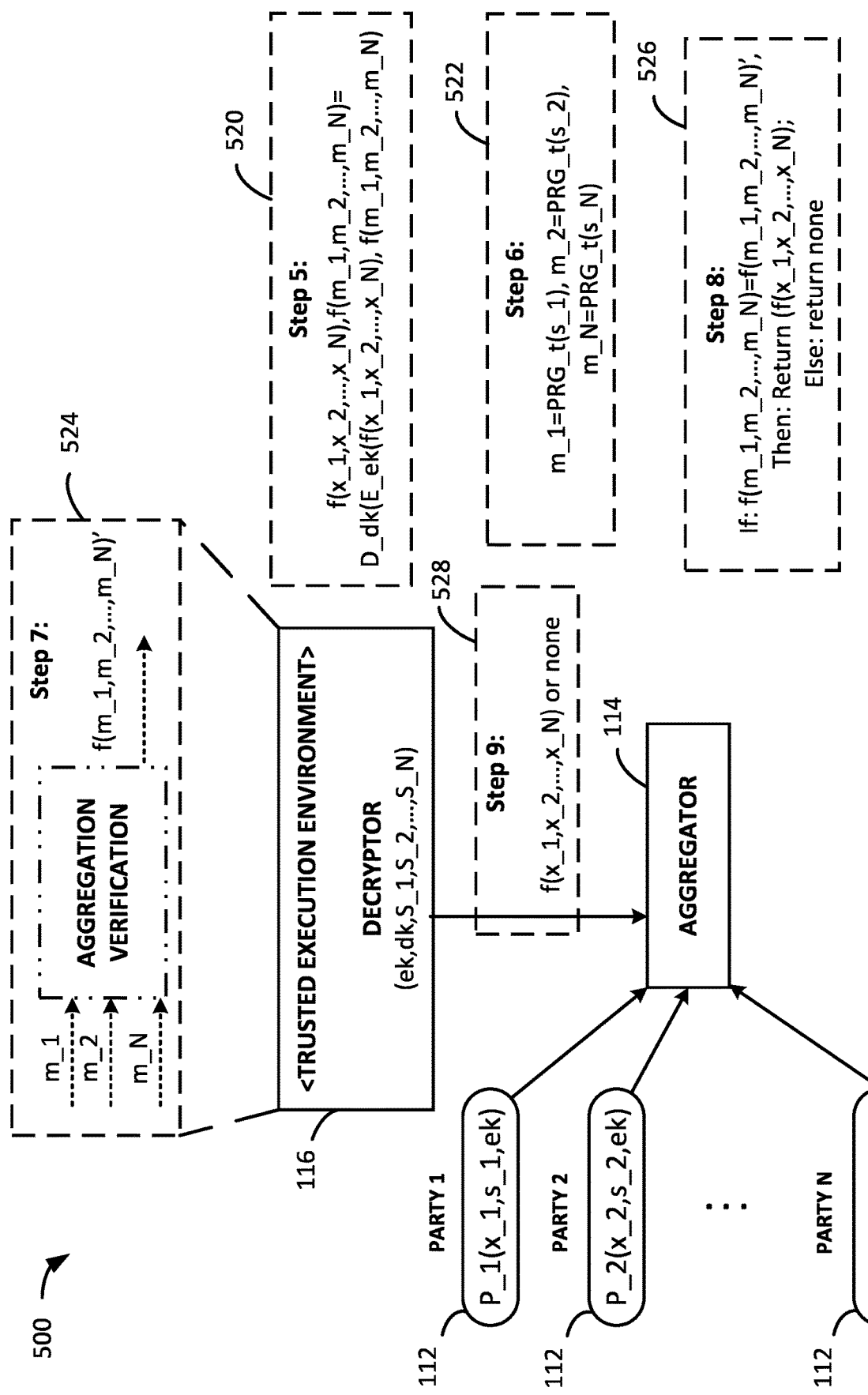
FIG. 6 is a continuation of the process for data aggregation and verification of FIG. 5, according to various embodiments.

At a third stage, the decryptor 116 decrypts the aggregator's 114 ciphertext to learn the aggregated data and the aggregated mark at 420 (step 5, 520 of FIG. 6). In order to verify the aggregated mark, the decryptor 116 first generates the marks of all parties 112 corresponding to that iteration at 422 (step 6, 522 of FIG. 6), and the decryptor 116 computes the aggregation of unencrypted plaintexts (or optionally any homomorphic operations in alternative embodiments) at 424 within a trusted execution environment (TEE) (step 7, 524 of FIG. 6) and compares the result generated by the decryptor 116 with the aggregated mark obtained from aggregator 114 at 426. According to the present disclosure, preferably all operations performed by the decryptor 116 are implemented within the TEE. The operations performed by the decryptor 116 in the TEE include computer-based decryption, aggregation (including of marks), comparison, and the like. If the decryptor 116 determines that the data is a match, and thus verified as authentic, the decryptor 116 sends the decrypted aggregated result to the aggregator 114 at 428. The aggregator 114 is then able to read and/or publish the decrypted data (steps 8 and 9, 526 and 528 of FIG. 6).

Figure 5:
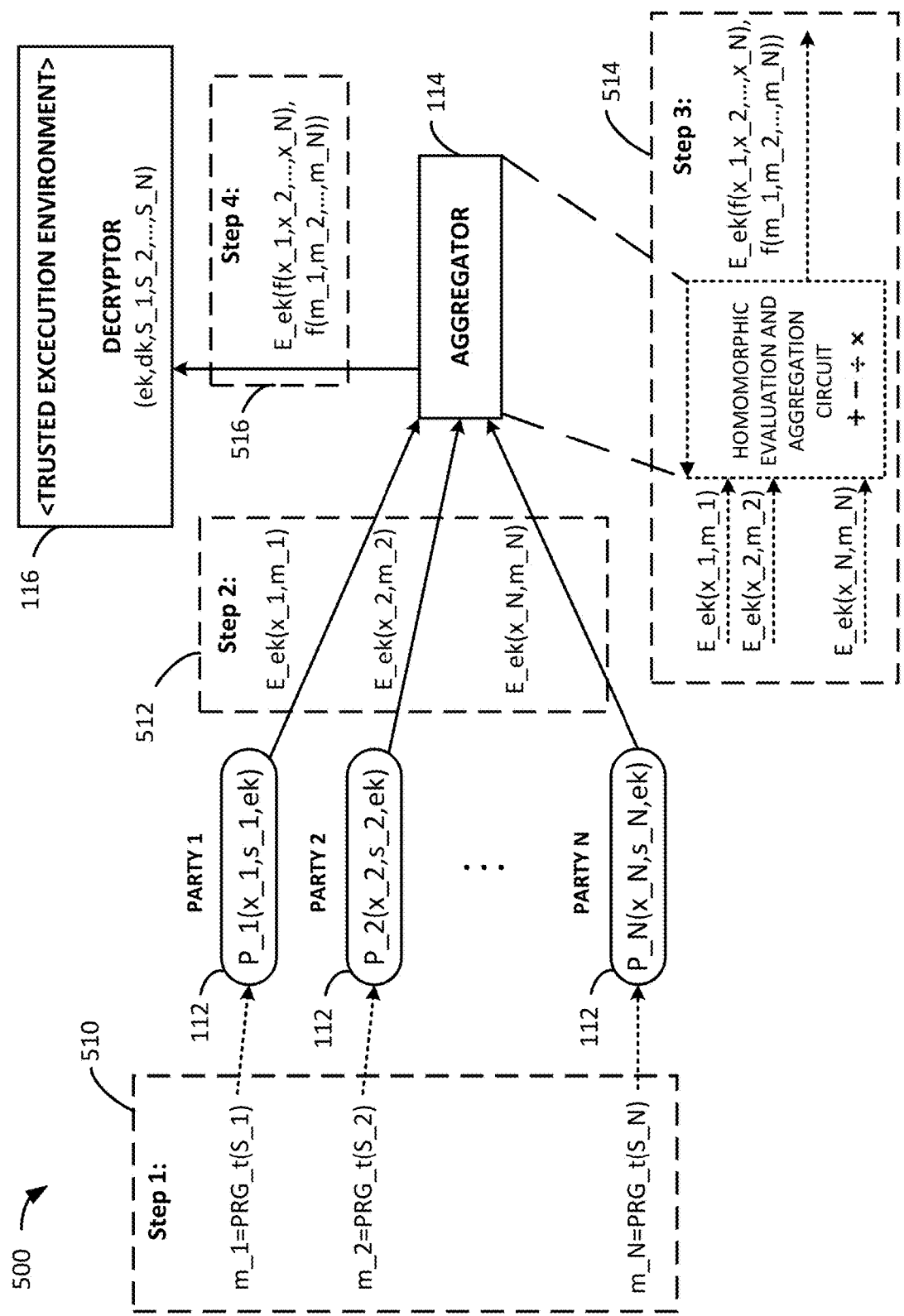
FIG. 5 is a process for data aggregation and verification, according to various embodiments.

FIGS. 5 and 6 show a process 500 for data aggregation and verification, according to various embodiments.

According to process 500, N parties (112) (or participants) are denoted (P_1, ..., P_N). Each party P_i holds a private input x_i. Parties are connected to a central party (e.g., the aggregator 114), which performs an aggregation function (f) over the N inputs from the N parties: f(x_1, ..., x_N). The aggregator 114 is preferably a computing platform or device composed of an aggregating server, and a decryptor 116 that includes and/or operates within a TEE for verifying operations performed by the aggregator 114. The decryptor 116 therefore is so named because it is a computer-based entity that decrypts the final result and thus verifies then authenticity of the aggregator's 114 output.

According to various embodiments, the N parties 112 are assumed to be semi-honest, and therefore follow the protocol's steps as expected. Embodiments of the present disclosure also limit the parties' 112 roles to providing inputs x_i. It is contemplated that each party 112 could intentionally or accidentally provide an erroneous or mistaken input that impacts the final result. Such wrong inputs from parties 112 are beyond the scope of the present disclosure. Nevertheless, in some embodiments and in order to mitigate such concerns, the N parties 112 can agree on a predefined or preset range of acceptable inputs, and an input check can be added to the interface of the application of each party 112 prior to advancing to further steps of the process 500.

As discussed above, the aggregator 114 is or could be malicious and willing to seek to learn any information about any private party 112 data x_i even by deviating from the steps of the protocol. Therefore, it can be assumed that the aggregator 114 is malicious. This assumption is one of the challenges addressed by the present disclosure. In process 500, the decryptor 116 is assumed to be semi-honest, and thus will perform the operations as assigned but may attempt to decipher data during the performance of the operations.

To achieve and ensure the security assumption of semi-honesty, the decryptor 116 is implemented in a TEE, as discussed above. The TEE preferably provides guarantees that the decryptor's 116 code cannot be tampered and that exposed application programming interfaces (APIs) are limited, as typically APIs do not reveal secret assets such as a secret decryption key. In some examples, the decryptor's 116 source code is made available to all participants and the aggregator 114 provides evidence that the version of the code running corresponds to the one reviewed by the participants. Therefore, possible attacks to change the behavior of the decryptor 116 are made challenging. Furthermore, the TEE provides assurances of the trustworthy state of the decryptor by various schemes related to the above.

Computer-based process 500 combines security guarantees provided by the TEE and those provided by the cryptographic techniques, such as HE and variations and versions thereof. Parties 112 preferably encrypt their own data $x\_i$ at step 1, 510, and send the corresponding ciphertexts to the aggregator 114 as shown at step 2, 512. As discussed, the aggregator 114 carries out HE, including for example homomorphic operations, on the parties' 112 inputs at step 3, 514 allows the aggregator 114 to aggregate encrypted data without being able to learn individual inputs. Then, aggregator 114 sends the aggregated ciphertext to the decryptor 116 at step 4, 516, after which the decryptor 116 independently verifies, decrypts and sends back the clear result to the aggregator 114 if authenticated at steps 5-9.

According to process 500 of FIG. 6, the decryptor 116 decrypts the aggregator's 114 ciphertext to learn the aggregated data and the aggregated mark at 420 (step 5, 520). In order to verify the aggregated mark, the decryptor 116 first generates the marks of all parties 112 corresponding to that iteration at 422 (step 6, 522), and the decryptor 116 computes the aggregation and any homomorphic operations at 424 within the TEE (step 7, 524) and compares the result generated by the decryptor 116 with the aggregated mark obtained from aggregator 114 at 426. If the decryptor 116 determines that the data is a match, and thus verified as authentic, the decryptor 116 sends the decrypted aggregated result to the aggregator 114 at 428. The aggregator 114 is then able to read and/or publish the decrypted data (steps 8 and 9, 526 and 528).

In order to prevent the aggregator 114 from using the decryptor 116 capability to decrypt individual ciphertexts, the parties 112 add some marks within their individual, packed ciphertexts. Preferably, only the decryptor 116 within the TEE is able to decrypt the parties' 112 marks and verify that the aggregator 114 is not trying to learn the decryption of an individual ciphertext.

The computer-based aggregation and homomorphic evaluation functions of the aggregator 114 can be represented by a circuit shown at step 3, 514 with a) only addition gates, b) only multiplicative gates, or c) a number of both addition and multiplication gates. As discussed above, a challenge related to various HE schemes is that each time data is manipulated, data noise is increased. Generally, multiplication operations and related gates increases noise in data more than addition operations and related gates.

Regarding the HE option a) with only addition gates, this can be useful to compute sums, arithmetic means, weighted sums, and variances/standard deviations, for example. Regarding only multiplicative gates, this can be useful to compute geometric means, and the like. Where the circuit has a number of both addition and multiplication gates as in option c), this can be useful to compute co-variances/correlation coefficients, to perform linear regression, and the like. For cases with a) only additive or b) only multiplicative gates, preferably partially homomorphic encryption (PHE) schemes are employed. For example, additive HE schemes for additive aggregations, multiplicative HE schemes for multiplicative aggregations. For the last type of computation c), in which both additive and multiplicative gates are both used, somewhat homomorphic encryption (SHE) schemes are preferably used, which allow the aggregator 114 to compute a limited number of additions and multiplications on the ciphertexts. Below, the PHE or SHE schemes described above are referred to as simply the HE scheme for simplicity.

As discussed above, HE schemes described herein can support a packing property, which includes the capability to pack one or more plaintext elements in one ciphertext, optionally also with a marking made by the party 112. This allows a party 112 to use a computer to encrypt each individual input as well as his mark in a single ciphertext to be sent to the aggregator 114. The aggregation executed by aggregator 114 is preferably applied on the inputs and the marks component-wise in a single instruction multiple data (SIMD) fashion.

In cases where the parties 112 would like to run several iterations of the private aggregation protocol over data that evolves over time, the aggregator 114, if malicious, can run replay attacks to cancel the effect of the parties' 112 marks unless the marks are refreshed on every iteration and operation. Therefore, according to the present disclosure, it is proposed to use a PRG in order to refresh the marks, in a random, but reproducible and traceable manner. A PRG produces random outputs, but based on a starting point or previous iteration such that multiple entities can perform the same pseudo random generation independently and come to the same results. This allows for optionally independent verification separate from the actual or original generation.

Various embodiments contemplated herein utilize generic multiparty computation (MPC) protocols. Some examples of MPC protocols and implementations include garbled circuits (GC) and/or linear secret sharing schemes (LSSS). GC and/or LSSS can be used to implement privacy-preserving data aggregation as discussed herein. Typically, GC is less well-suited to scale to more than two parties 112. Generic LSSS protocols can provide security against an active adversary such as the "SPDZ" protocol, which imply significant communication and computation overheads. In addition, the generic LSSS protocols may necessitate direct communication links between parties 112, which may not be practical in various real-world use cases.

Various advantages of the present disclosure include a computer with improved security, particularly when it is assumed that the aggregator 114 is operating as a malicious aggregator as discussed herein. The present disclosure also provides improved computer-based confidentiality of individual party 112 inputs, e.g., using HE techniques. The present disclosure also provides a limitation of the aggregator's 114 decryption capability by requiring verification by the decryptor 116 of aggregated ciphertexts before returning the decrypted result to the aggregator 114. The present disclosure further provides improved confidentiality of decryption key and marks: The TEE of the decryptor 116 ensures confidentiality and integrity of any data and/or code loaded inside TEE, and provides a limitation of available application programming interfaces (APIs). The present disclosure provides improved efficiency. Specifically, unlike certain fully HE (FHE) schemes, which imply significant overhead, certain PHE/SHE schemes described herein are practical solutions that provide computationally efficient encryption/decryption/evaluation and smaller sizes of ciphertexts/keys.

Furthermore, the present disclosure provides greater simplicity compared to existing options. The present disclosure does not require an additional entity, as the aggregator 114 and decryptor 116 can be hosted virtually by a single physical entity, such as a computer or server as described herein. The present disclosure only requires communication links between the aggregating entity (aggregator 114) and the data owners (parties 112) and is therefore suitable and beneficial in many real-world applications.

The present disclosure yet further provides the advantage of improved flexibility in computer-based security and data management. Most aggregation functions can be implemented using the approaches described herein, provided the function can be written as a circuit of a limited number of multiplications and/or additions, sometimes referred to as "depth." The choice of the PHE/SHE scheme and its parameters can then be adjusted according to the aggregation function's depth. Several SHE schemes can be used with different computational/memory overheads. In case of aggregation functions that involve only either addition or multiplication, efficient PHE schemes can be used.

The present disclosure even yet further provides the advantage of improved computer-based scalability. For example, the number of communication rounds (e.g., iterations) of the protocol is constant and preferably does not depend on the number of parties 112 involved. Furthermore, the total amount of data and the computational cost have linear scalability on the number of Participants.

Figure 7:
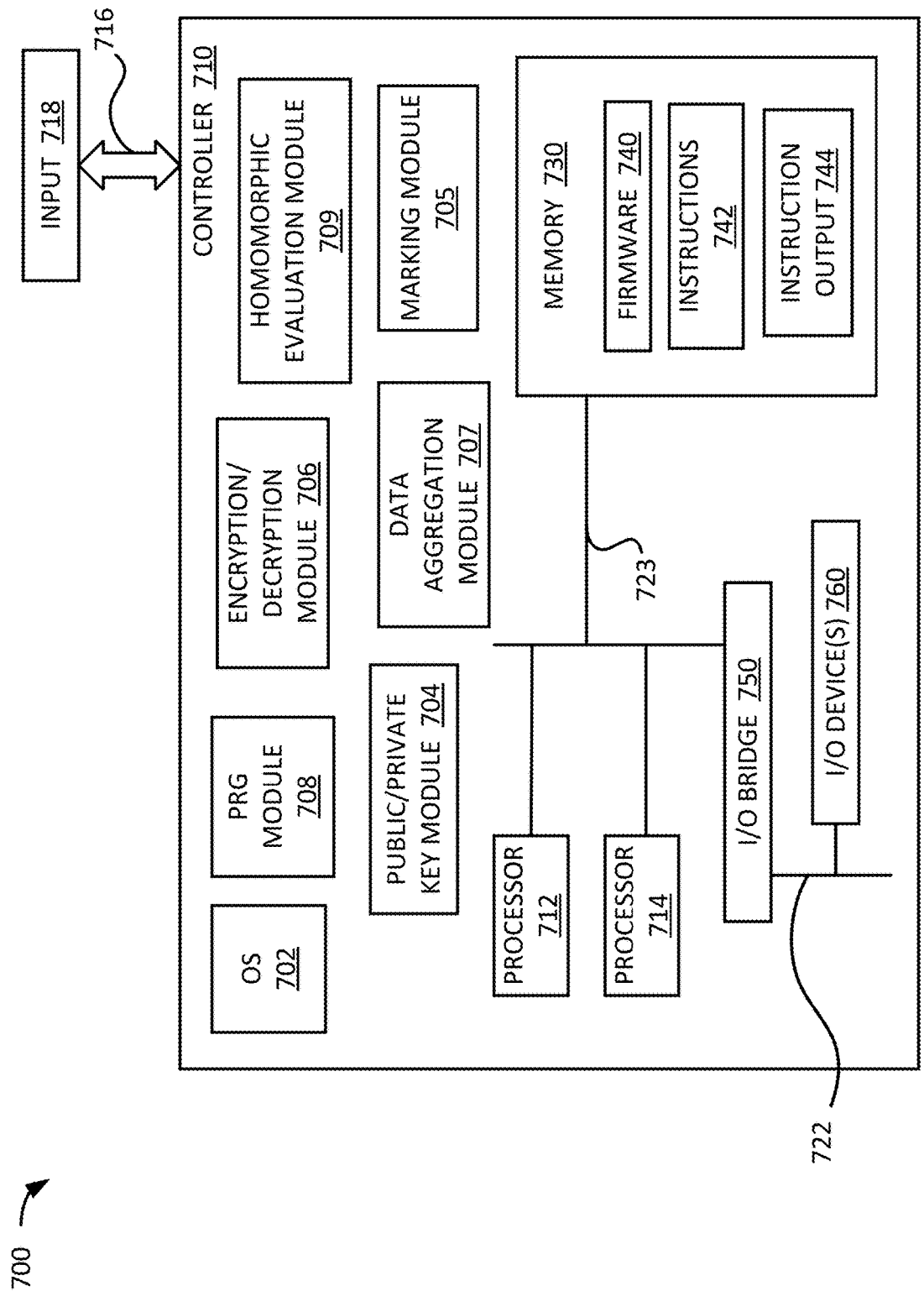
FIG. 7 is a block schematic diagram of a computer system according to embodiments of the present disclosure.

FIG. 7 is a block schematic diagram of a computer system 700 according to embodiments of the present disclosure. The computer system 700 can be implemented according to the computing environment 100 of FIG. 1.

Computer system 700, as shown, is configured with an interface 716 to enable controller 710 to receive a request to provide aggregation and aggregator 114 authentication in a minimal trust environment, as described in particular with regard to FIGS. 1-6. An input 718 may be received at interface 716. In embodiments, the interface 716 can enable controller 710 to receive, or otherwise access, the input 718 via, for example, a network (e.g., an intranet, or a public network such as the Internet), or a storage medium, such as a disk drive internal or connected to controller 710. The interface can be configured for human input or other input devices, such as described later in regard to components of controller 710. It would be apparent to one of skill in the art that the interface can be any of a variety of interface types or mechanisms suitable for a computer, or a program operating in a computer, to receive or otherwise access or receive a source input or file.

Processors 712, 714 included in controller 710 are connected by a memory interface 720 to memory device or module 730. In embodiments, the memory 730 can be a cache memory, a main memory, a flash memory, or a combination of these or other varieties of electronic devices capable of storing information and, optionally, making the information, or locations storing the information within the memory 730, accessible to a processor. Memory 730 can be formed of a single electronic (or, in some embodiments, other technologies such as optical) module or can be formed of a plurality of memory devices. Memory 730, or a memory device (e.g., an electronic packaging of a portion of a memory), can be, for example, one or more silicon dies or chips, or can be a multi-chip module package. Embodiments can organize a memory as a sequence of bit, octets (bytes), words (e.g., a plurality of contiguous or consecutive bytes), or pages (e.g., a plurality of contiguous or consecutive bytes or words).

In embodiments, computer 700 can include a plurality of memory devices. A memory interface, such as 720, between one or more processors and one or more memory devices can be, for example, a memory bus common to one or more processors and one or more memory devices. In some embodiments, a memory interface, such as 723, between a processor (e.g., 712, 714) and a memory 730 can be point to point connection between the processor and the memory, and each processor in the computer 700 can have a point-to-point connection to each of one or more of the memory devices. In other embodiments, a processor (for example, 712) can be connected to a memory (e.g., memory 730) by means of a connection (not shown) to another processor (e.g., 714) connected to the memory (e.g., 723 from processor 714 to memory 730).

Computer 700 can include an input/output (I/O) bridge 750, which can be connected to a memory interface 720, or to processors 712, 714. An I/O bridge 750 can interface the processors 712, 714 and/or memory devices 730 of the computer 700 (or, other I/O devices) to I/O devices 760 connected to the bridge 750. For example, controller 710 includes I/O bridge 750 interfacing memory interface 723 to I/O devices, such as I/O device 760. In some embodiments, an I/O bridge can connect directly to a processor or a memory, or can be a component included in a processor or a memory. An I/O bridge 750 can be, for example, a peripheral component interconnect express (PCI-Express) or other I/O bus bridge, or can be an I/O adapter.

The I/O bridge 750 can connect to I/O devices 760 by means of an I/O interface, or I/O bus, such as I/O bus 722 of controller 710. For example, I/O bus 722 can be a PCI-Express or other I/O bus. I/O devices 760 can be any of a variety of peripheral I/O devices or I/O adapters connecting to peripheral I/O devices. For example, I/O device 760 can be a graphics card, keyboard or other input device, a hard disk drive (HDD), solid-state drive (SSD) or other storage device, a network interface card (NIC), etc. I/O devices 760 can include an I/O adapter, such as a PCI-Express adapter, that connects components (e.g., processors or memory devices) of the computer 700 to various I/O devices 760 (e.g., disk drives, Ethernet networks, video displays, keyboards, mice, styli, touchscreens, etc.).

Computer 700 can include instructions executable by one or more of the processors 712, 714 (or, processing elements, such as threads of a processor). The instructions can be a component of one or more programs. The programs, or the instructions, can be stored in, and/or utilize, one or more memory devices of computer 700. As illustrated in the example of FIG. 7, controller 710 includes a plurality of programs or modules, such as public/private key module 704, marking module 705 (which can include seeding functionality), encryption/decryption module 706 (which can include authentication functionality), data aggregation module 707, PRG module 708, and homomorphic evaluation module 709. A program can be, for example, an application program, an operating system (OS) or a function of an OS, or a utility or built-in function of the computer 700. A program can be a hypervisor, and the hypervisor can, for example, manage sharing resources of the computer 700 (e.g., a processor or regions of a memory, or access to an I/O device) among a plurality of programs or OSes.

Programs can be "stand-alone" programs that execute on processors and use memory within the computer 700 directly, without requiring another program to control their execution or their use of resources of the computer 700. For example, controller 710 includes (optionally) stand-alone programs in public/private key module 704, marking module 705, encryption/decryption module 706, data aggregation module 707, PRG module 708, and homomorphic evaluation module 709. A stand-alone program can perform particular functions within the computer 700, such as controlling, or interfacing (e.g., access by other programs) an I/O interface or I/O device. A stand-alone program can, for example, manage the operation, or access to, a memory (e.g., memory 730). A basic I/O subsystem (BIOS), or a computer boot program (e.g., a program that can load and initiate execution of other programs) can be a standalone program.

Controller 710 within computer 700 can include one or more OS 702, and an OS 702 can control the execution of other programs such as, for example, to start or stop a program, or to manage resources of the computer 700 used by a program. For example, controller 710 includes OS 702, which can include, or manage execution of, one or more programs, such as OS 702 including (or, managing) public/private key module 704, marking module 705, encryption/decryption module 706, data aggregation module 707, PRG module 708, and homomorphic evaluation module 709. In some embodiments, an OS 702 can function as a hypervisor.

A program can be embodied as firmware (e.g., BIOS in a desktop computer, or a hypervisor) and the firmware can execute on one or more processors and, optionally, can use memory, included in the computer 700. Firmware can be stored in a memory (e.g., a flash memory) of the computer 700. For example, controller 710 includes firmware 740 stored in memory 730. In other embodiments, firmware can be embodied as instructions (e.g., comprising a computer program product) on a storage medium (e.g., a CD-ROM, DVD-ROM, flash memory, or disk drive), and the computer 700 can access the instructions from the storage medium.

In embodiments of the present disclosure, computer 700 can include instructions for data management and protection. Controller 710 includes, for example, public/private key module 704, marking module 705, encryption/decryption module 706, data aggregation module 707, PRG module 708, and homomorphic evaluation module 709, which can operate to provide privacy-preserving homomorphic encryption according to various embodiments herein.

The example computer system 700 and controller 710 are not intended to be limiting to embodiments. In embodiments, computer system 700 can include a plurality of processors, interfaces, and inputs and can include other elements or components, such as networks, network routers or gateways, storage systems, server computers, virtual computers or virtual computing and/or I/O devices, cloud-computing environments, and so forth. It would be evident to one of skill in the art to include a variety of computing devices interconnected in a variety of manners in a computer system embodying aspects and features of the disclosure.

In embodiments, controller 710 can be, for example, a computing device having a processor (e.g., 712) capable of executing computing instructions and, optionally, a memory 730 in communication with the processor. For example, controller 710 can be a desktop or laptop computer; a tablet computer, mobile computing device, personal digital assistant (PDA), or cellular phone; or, a server computer, a high-performance computer (HPC), or a super computer. Controller 710 can be, for example, a computing device incorporated into a wearable apparatus (e.g., an article of clothing, a wristwatch, or eyeglasses), an appliance (e.g., a refrigerator, or a lighting control), a mechanical device, or, e.g., a motorized vehicle. It would be apparent to one skilled in the art that a computer embodying aspects and features of the disclosure can be any of a variety of computing devices having processors and, optionally, memory devices, and/or programs.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A method of improving data security or privacy in a homomorphic encryption computing environment, comprising:
providing a public encryption key and a seed to a party of one or more parties;
receiving an encrypted data set encrypted using the public encryption key and marked by the party with a first mark based on the seed;
aggregating the encrypted data set into an aggregated data set at an aggregator;
receiving an indication that an operation associated with the party has been performed on the aggregated data set;
in response to the receiving the indication, updating the encrypted data set of the aggregated data set by updating the mark to a second mark according to the operation;
generating a verification encrypted data set according to at least the second mark and at least the corresponding operation;
verifying the aggregated data set by comparing the updated first encrypted data set and the verification encrypted data set; and
decrypting the aggregated data set in response to the aggregated data set being verified, and transmitting the decrypted aggregated data set to the aggregator,
wherein the decrypting is performed by a decryptor, and
wherein the decryptor, separately and independently of the aggregator, verifies the updated aggregated data set by generating marks corresponding to the operation and the aggregated data set and for each of the one or more parties.

2. The method of claim 1, wherein the decryptor uses a private key to perform the decryption.

3. The method of claim 1, wherein the aggregator is an entity that is assumed to be non-trusted by at least the decryptor.

4. The method of claim 3, wherein the aggregator is assumed to be malicious, and is assumed to deviate from steps of a requested protocol.

5. The method of claim 1, wherein the decryptor is assumed to be semi-honest, and is assumed to follow steps of a requested protocol.

6. The method of claim 5, wherein the decryptor comprises a trusted execution environment.

7. The method of claim 6, wherein a certificate is generated when code is executed accurately within the trusted execution environment of the decryptor.

8. The method of claim 1, wherein the encrypted data set comprises private information of the party.

9. The method of claim 1, further comprising updating the first mark to the second mark according to the operation and using a pseudo random generator.

10. The method of claim 1, wherein the operation corresponds to a first iteration.

11. The method of claim 1, wherein the aggregator and decryptor are virtual computing entities hosted by a single host.

12. The method of claim 1, wherein the operation is performed according to a homomorphic encryption scheme.

13. The method of claim 12, wherein the homomorphic encryption scheme supports a packing property, in which one or more plaintexts and/or at least one mark are combined into a single ciphertext.

14. The method of claim 12, wherein the homomorphic encryption scheme comprises additive gates, multiplicative gates, or both.

15. The method of claim 1, wherein the decryptor provides each of the one or more parties with a pseudo random generator with which the one or more parties generate random numbers based on received seeds and public encryption key.

16. A system, comprising:
   a hardware processor operatively coupled to a memory;
   the hardware processor configured to execute instructions stored on the memory, including instructions for a process for improving data security or privacy in a computing environment, the process comprising:
   providing a public encryption key and a seed to a party of one or more parties;
   receiving an encrypted data set encrypted using the public encryption key and marked by the party with a first mark based on the seed;
   aggregating the encrypted data set into an aggregated data set at an aggregator;
   receiving an indication that an operation associated with the party has been performed on the aggregated data set;
   in response to the receiving the indication, updating the encrypted data set of the aggregated data set by updating the first mark to a second mark according to the operation;
   generating a verification encrypted data set according to at least the second mark and at least the corresponding operation;
   verifying the aggregated data set by comparing the updated encrypted data set and the verification encrypted data set; and
   decrypting the aggregated data set in response to the aggregated data set being verified, and transmitting the decrypted aggregated data set to the aggregator,
   wherein the decrypting is performed by a decryptor, and
   wherein the decryptor, separately and independently of the aggregator, verifies the updated aggregated data set by generating marks corresponding to the operation and the aggregated data set and for each of the one or more parties.

17. A computer program product for improving data security or privacy, the computer program product comprising a non-transitory computer-readable storage medium having program code embodied therewith, the program code comprising computer-readable program code configured to cause a processor to perform the steps of:
   providing a public encryption key and a seed to a party of one or more parties;
   receiving an encrypted data set encrypted using the public encryption key and marked by the party with a first mark based on the seed;
   aggregating the encrypted data set into an aggregated data set at an aggregator;
   receiving an indication that an operation associated with the party has been performed on the aggregated data set;
   in response to the receiving the indication, updating the encrypted data set of the aggregated data set by updating the first mark to a second mark according to the operation;
   generating a verification encrypted data set according to at least the second mark and at least the corresponding operation;
   verifying the aggregated data set by comparing the updated encrypted data set and the verification encrypted data set; and
   decrypting the aggregated data set in response to the aggregated data set being verified, and transmitting the decrypted aggregated data set to the aggregator,
   wherein the decrypting is performed by a decryptor, and
   wherein the decryptor, separately and independently of the aggregator, verifies the updated aggregated data set by generating marks corresponding to the operation and the aggregated data set and for each of the one or more parties.

* * * * *